United States Patent Office 3,388,071
Patented June 11, 1968

3,388,071
LIQUID LASING SOLUTION FORMED WITH TRIFLUOROACETYLACETONATE
Richard B. Nehrich, Jr., and Erhard J. Schimitschek, San Diego, and John A. Trias, La Mesa, Calif., assignors to the United States of America as represented by the Secretary of the Navy
No Drawing. Filed Sept. 28, 1964, Ser. No. 399,946
3 Claims. (Cl. 252—301.2)

ABSTRACT OF THE DISCLOSURE

A liquid lasing composition is provided, the composition being a solution of an ammonia salt of the tetrakis europium trifluoroacetylacetonate (Eu(TFAA)$_4$HA). The chelate crystals are precipitated from a non-aqueous solution with anhydrous ammonia to produce the ligation between the europium, the four diketone groups and the ammonia. The liquid lasing solution is formed by dissolving the crystals in a balanced alcoholic solvent system.

---

The invention described herein may be manufactured and used by or for the Government of the United States of America for governmental purposes without the payment of any royalties thereon or therefor.

The present invention relates to chelate lasers and, in particular, to lasing compounds formed of rare earth chelates.

Prior work done in the field of chelate lasers has demonstrated that a few chelates prepared from particular beta-diketones can be caused to exhibit stimulated emission. However, as shown in our co-pending application Ser. No. 399,944, filed Sept. 28, 1964 now abandoned and entitled, "A Chelate Lasing Compound With Europium Benzoylacetonate," the lasing capability of the chelates is due primarily to the manner in which the chelate is prepared. More specifically, the stimulated emission which has been noticed apparently occurs as the result of a chemically-modified chelate. For example, europium dibenzoylmethide can be made to lase if prepared with piperidine, but not if prepared with ammonia. On the other hand, europium benzoylacetonate can be successfully prepared with ammonia, piperidine and other aliphatic bases. The net result is that the lasing action is dependent upon the existence of a chelate modified by a particular base, which, as known in the art, is used as a precipitant in preparing the chelate.

It is quite desirable to develop other similar lasers particularly since these lasers hold the prospect of eventually providing a continuous range of laser wavelengths. Also, it appears that these chelate lasers can be economically used due to the relatively low optical pumping power required to achieve the stimulated emission.

An object of the present invention therefore is to provide a new chelate laser and, as will be described, this laser is europium trifluoroacetylacetonate prepared in a certain manner with ammonia and subsequently dissolved in an alcoholic solvent to provide a particular molar solution of the modified chelate.

Before further detailing of the manner in which this particular chelate is prepared, it should be generally noted that the lasing ability of fluoro-chemicals, such as the beta-diketone, trifluoroacetylacetonate, is somewhat contra to expectations. The unmodified chelate, europium trifluoroacetylacetonate, apparently does not lase and it also appears that the desired lasing action is not exhibited when this chelate is prepared with previously-successful amine bases, such as piperidine. However, as will be shown, an ammonia-modified europium trifluoroacetylacetonate does exhibit the desired stimulated emission. Apparently this lasing compound can be chemically written as Eu(TFAA)$_4$HA in which the final "A" stands for ammonia.

In preparing the chelate, trifluoroacetylacetone was dissolved in ethanol together with europium chloride in a molar ratio of 4:1. Passing anhydrous ammonia through the solution resulted in a light colored precipitate, the initial part of which contained some NH$_4$Cl and was discarded. The main part, consisting of small, needle-like crystals, was washed with ethanol and air dried. Elementary analysis indicated that, in this compound, the central europium ion is ligated with four diketone groups and one molecule of the precipitating base, of which, of course, is the ammonia. This material, which may be written Eu(TFAA)$_4$HA was found to have a melting point of about 190–192° C.

To provide the lasing solution, Eu(TFAA)$_4$HA crystals were dissolved in a mixture of ethanol and methanol in a volume ratio of 3:1; the alcohols, of course, acting as a solvent and the resulting compound being a $1.5 \times 10^{-2}$ molar solution of the modified chelate. This liquid solution was transferred into a quartz capillary cell, cooled to about $-150°$ C. and excited by a xenon flashlamp in an elliptical laser head. The details of this particular laser head are described in a co-pending application of Schimitschek et al., entitled "Liquid Laser Cell," Ser. No. 329,593, filed Dec. 10, 1962, although similar laser heads, described elsewhere in the literature, may be used.

Above a certain threshold pump energy, the chelate showed spiking, beam collimation and line narrowing in the fluorscence output. As is well-known, the necessary threshold pump energy varies widely depending upon such considerations as the purity of the sample, the alignment and conditions of the laser head mirrors, the type of reflective coating on the mirrors, temperature and so forth. In one sample, the threshold energy was 670 joules, although considerably lower pump energy should be obtainable.

The laser wavelength may be measured on a grating spectrograph with a 20 A./mm. dispersion, or by other appropriate means. Using the grating spectrograph method, which is known to those familiar with this art, the Eu(TFAA)$_4$HA was found to have a wavelength of 6,122 A.

Fluorescenece spectra of the chelate was determined at about a $-140°$ C. using a Cary Model 14 spectrophotometer adapted for fluorescence work. The spectra were taken between 5,700 and 6,400 A., covering the range of $5_{D_0}-7_{F_0}$, $7_{F_1}$ and $7_{F_2}$ transition groups. Within the $5_{D_0}-7_{F_2}$ group, Eu(TFAA)$_4$HA had a characteristic sharp peak at 6,122 A. As an indication of the importance of employing the ammonia at the precipitating base and the preparation of the chelate, another solution was prepared in precisely the same manner as has been described with the exception that this other solution substituted piperidine for the ammonia. The fluorescence spectrum of Eu-TFAA prepared with piperidine was found to be about ten times less intense and contained more and broader lines in the $5_{D_0}-7_{F_2}$ group. This solution of the chelate prepared with piperidine did not last. Therefore, it appears to be strong evidence establishing the fact that the base strongly influences the fluorescence spectrum as well as the effectiveness of the intra-molecular energy transfer.

Primarily, as will have been surmised, the present invention provides a novel laser material, the importance of which in ultimate laser applications is yet to be determined although it clearly is one of a family of rare earth chelates which, as has been stated, gives promise of providing a continuous range of laser wavelengths.

Obviously many modifications and variations of the present invention are possible in the light of the above

What is claimed is.

1. A lasing composition consisting essentially of a liquid solution of a chelate dissolved in a balanced alcoholic solvent system, said chelate being an ammonia-modified europium trifluoroacetylacetonate formed as a crystalline substance precipitated with anhydrous ammonia out of an alcoholic solution of an europium salt and trifluoroacetylacetone, and having the formula $$Eu(TFAA)_4HA$$

in which TFAA is trifluoroacetylacetonate and the final A is ammonia, said alcoholic solvent system being a mixture of ethanol and methanol in a volume ratio of 3:1.

2. The lasing composition of claim 1 wherein said liqud solution is a $1.5 \times 10^{-2}$ molar solution of the chelate.

3. The lasing composition of claim 2 wherein said alcoholic solution is a solution of trifluoroacetylacetone and europium chloride in a molar ratio of 4:1.

References Cited

UNITED STATES PATENTS 3,225,307  12/1965  Weissman _____ 252—301.2

OTHER REFERENCES

Crosby et al., Spectroscopic Studies of Rare Earth Chelates, Journal of Physical Chemistry, vol. 66, No. 12, December 1962, p. 2493.

TOBIAS E. LEVOW, *Primary Examiner.*

HELEN M. McCARTHY, ROBERT D. EDMONDS, *Examiners.*